(12) United States Patent
Jørgensen et al.

(10) Patent No.: US 11,345,451 B2
(45) Date of Patent: May 31, 2022

(54) HULL AND CARGO HOLD CLEANING APPARATUS AND METHOD

(71) Applicant: CLIIN APS, Hovedstaden (DK)

(72) Inventors: Thomas Jørgensen, Allerød (DK); Michael Iversen, Valby (DK); Nikolaj Hans Bramsen Kloster, Bagsværd (DK); Bo Møller Hansen, Gentofte (DK)

(73) Assignee: CLIIN APS, Søborg (DK)

( * ) Notice: Subject to any disclaimer, the term of this patent is extended or adjusted under 35 U.S.C. 154(b) by 0 days.

(21) Appl. No.: 17/223,441

(22) Filed: Apr. 6, 2021

(65) Prior Publication Data

US 2021/0221483 A1 Jul. 22, 2021

Related U.S. Application Data

(63) Continuation of application No. 16/327,380, filed as application No. PCT/DK2017/050266 on Aug. 18, 2017, now Pat. No. 10,981,635.

(30) Foreign Application Priority Data

Aug. 23, 2016 (DK) .............................. PA201670635
Mar. 2, 2017 (DK) .............................. PA201770152

(51) Int. Cl.
*B63B 59/10* (2006.01)
*B63B 57/02* (2006.01)
(Continued)

(52) U.S. Cl.
CPC ............ *B63B 59/10* (2013.01); *B62D 55/075* (2013.01); *B62D 55/0847* (2013.01);
(Continued)

(58) Field of Classification Search
CPC ... B63B 57/02; B63B 59/06; B63B 2059/065; B63B 59/08; B63B 2059/082;
(Continued)

(56) References Cited

U.S. PATENT DOCUMENTS 3,088,429 A * 5/1963 Johannessen ........... B63B 59/10
114/222
3,960,229 A * 6/1976 Shio ...................... B62D 55/265
180/9.62

(Continued)

FOREIGN PATENT DOCUMENTS

CN 1789062 A 6/2006
CN 101704241 A 5/2010
(Continued)

OTHER PUBLICATIONS

Danish Patent and Trademark Office, Intention to grant, application No. PA201670635, dated Mar. 23, 2017.

(Continued)

*Primary Examiner* — Ajay Vasudeva
(74) *Attorney, Agent, or Firm* — Ziegler IP Law Group, LLC

(57) ABSTRACT

An apparatus for cleaning the outer side of the hull of a marine vessel and for cleaning the wall of cargo holds, the apparatus including a housing provided with magnetic continuous tracks at opposing lateral sides of the housing, a front wheel and a rear wheel for each of the magnetic continuous tracks, each magnetic continuous track including a plurality of links interconnected by drive pins, the links having an inwardly facing side and an outwardly facing side, a guide configured to engage the drive pins for preventing the links in a first portion of the extent of the of at least one of the magnetic continuous tracks between the front wheel and the rear wheel from moving in the direction in which the outwardly facing side faces and a submersible apparatus for (Continued)

cleaning the outer side of the hull of a marine vessel and for cleaning the wall of cargo space in the cargo holds that comprises a watertight housing provided with continuous magnetic tracks at opposing lateral sides of the housing. A watertight housing provided with continuous magnetic tracks at opposing lateral sides of said housing. At least one drive motor in the housing operably connected to at least one continuous magnetic track for driving the continuous magnetic tracks. The housing being provided with a main side between the continuous magnetic tracks.

15 Claims, 12 Drawing Sheets

(51) Int. Cl.
   *B62D 55/265*   (2006.01)
   *B62D 55/084*   (2006.01)
   *B62D 55/21*    (2006.01)
   *B62D 55/075*   (2006.01)
(52) U.S. Cl.
   CPC ........... *B62D 55/21* (2013.01); *B62D 55/265* (2013.01); *B63B 57/02* (2013.01)
(58) Field of Classification Search
   CPC . B63B 2059/087; B63B 59/10; B62D 55/075; B62D 55/0847; B62D 55/20; B62D 55/202; B62D 55/205; B62D 55/21; B62D 55/211; B62D 55/215; B62D 55/265
   See application file for complete search history.

(56) References Cited

U.S. PATENT DOCUMENTS

| | | | |
|---|---|---|---|
| 9,193,402 B2* | 11/2015 | Chin | .......................... B25J 5/00 |
| 10,981,635 B2* | 4/2021 | Jorgensen | ............ B62D 55/075 |
| 2014/0230711 A1 | 8/2014 | Lovelace et al. | |

FOREIGN PATENT DOCUMENTS

| | | | | |
|---|---|---|---|---|
| CN | 106428460 B | | 6/2018 | |
| EP | 1650116 A1 | * | 4/2006 | ............ B63B 59/10 |
| GB | 2528871 A | | 2/2016 | |
| JP | S51132543 A | | 11/1976 | |
| JP | H0342384 A | | 2/1991 | |
| JP | S6189184 A | | 6/1994 | |
| KR | 1020080093536 A | | 10/2008 | |
| KR | 1020160007140 A | | 1/2016 | |
| KR | 1020160069365 A | | 6/2016 | |

OTHER PUBLICATIONS

International Preliminary Report on Patentability, Application No. PCT/DK2017/050266, dated Feb. 26, 2019, 12 pages.

IP Australia, Examination report No. 1 for your standard patent application, Application No. 2017316358, dated Jul. 13, 2021, 6 pages.

Korean Patent Office, Notification of Reason for Refusal, Application No. 1020207020213, dated Apr. 23, 2021, 4 pages.

* cited by examiner

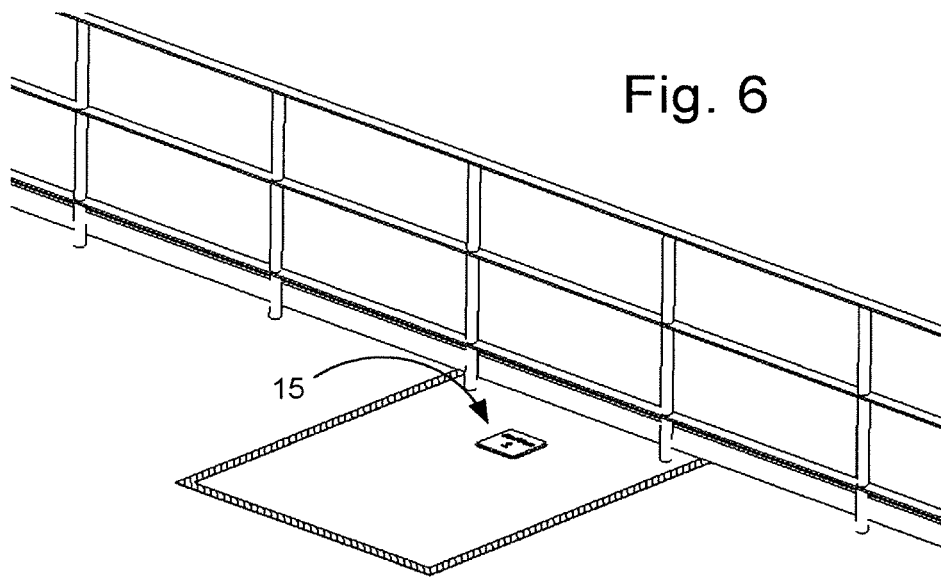
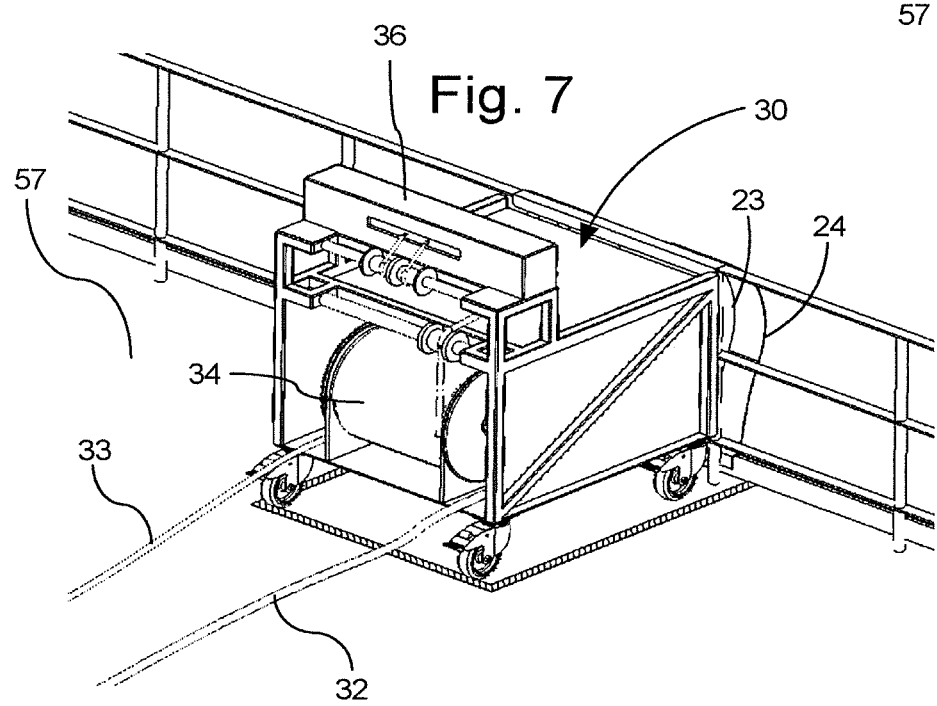

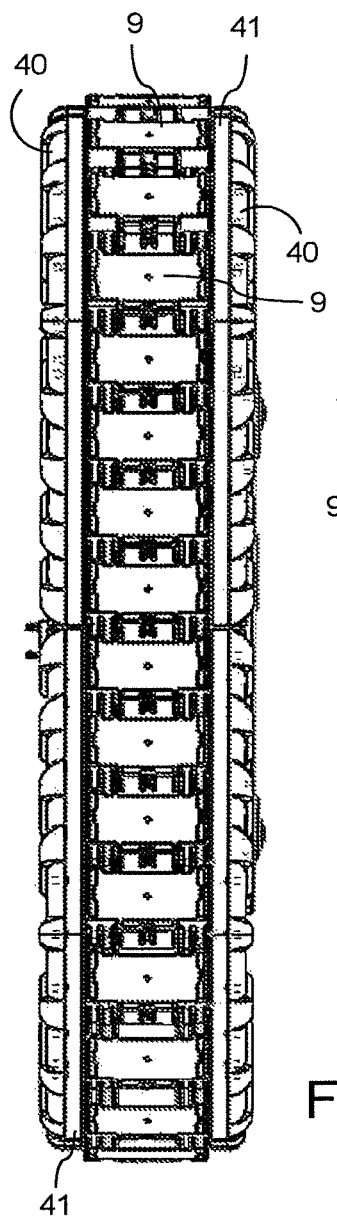
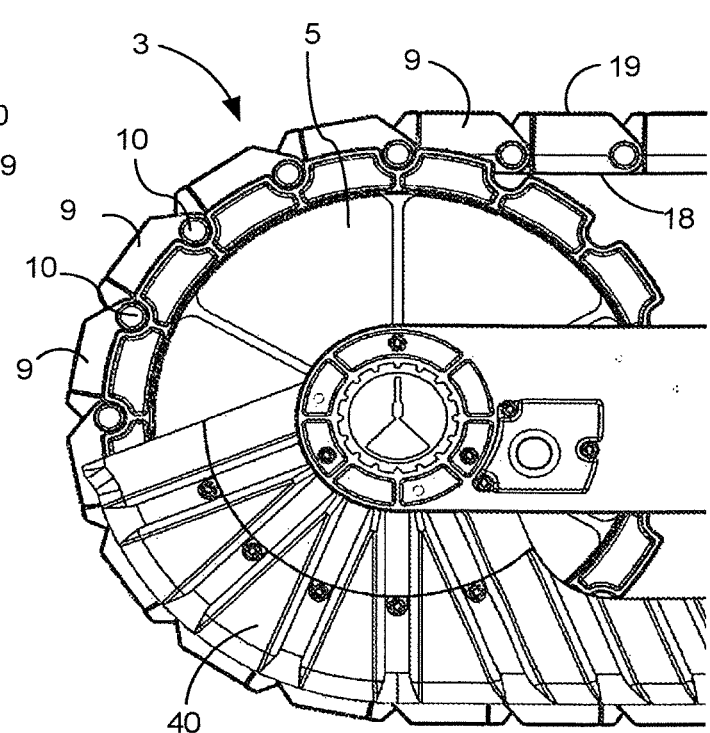
Fig. 14
Fig. 15

HULL AND CARGO HOLD CLEANING APPARATUS AND METHOD

TECHNICAL FIELD

The aspects of the disclosed embodiments relate to a permanently installed cleaning apparatus, in particular to a hull cleaning apparatus that is attached to the hull or wall of a cargo room by magnetic continuous tracks as well as an apparatus for removing deposits, organic and inorganic, from both submerged and unsubmerged surfaces of the hull of a marine vessel as well as wall of the cargo hold in the hull of a marine vessel.

BACKGROUND

Increased competition in the shipping industry creates increased focus on cost reduction. Fuel is the single biggest cost driver for a shipping company. Big ships use 100+ tons of fuel per day. General trade, slow steaming and idle periods are conditions where marine growth (fouling) thrives. Marine growth increases the degree of surface roughness of submerged portions of marine vessels and has a significant effect on both ship fuel efficiency and on the speed which can be achieved at a given propeller speed. For marine vessels, commercial, private, or military, losses in ship performance have a variety of consequences, both financial and in terms of meeting scheduled arrival dates.

There are also environmental reasons for regularly cleaning the whole of marine vessel. Stricter global environmental global regulations are expected in the near future, combined with a potential future ban of biocidal antifouling products. Regulations against transfer of foreign aquatic invasive species, for protection of e.g. coral reefs are also likely to be implemented in the not very distant future. Living up to such regulation will require a clean hull at all times as the apparatus will be permanently installed on the vessel and therefore available to maintain a clean hull regardless of the ships location. Use of divers for hull cleaning brings health and safety issues since divers do sometimes perish during cleaning operations. This adds negatively to safety statistics and reports to top managements.

Some new high performance paint types (silicone paint), with no or less biocides are unable to perform and requires continuous cleaning. Quality cleaning is rarely available when needed i.e. at the location where the ship is located at the time that cleaning is required. The quality of available solutions is often impossible to control or verify. Low-quality cleaning solutions may damage coating, which inflicts further economical consequence for the ship owner.

Most existing solutions can only clean below the water line. All existing solutions are "call on demand" services that are contracted when the "damage is done". At this point in time, the added fuel consumption has already created significant costs for the charterer or ship owner. Extensive crew is required for call on demand services (HQ, Agent, Port Authorities or Cleaning company). Call on demand cleaning is expensive. Cleaning is often not finished as cleaning can only be done during daytime and only on one side of the ship if alongside in a port. The administration part is very intensive and requires a large variety of different steps including approval of diving companies, ships agents, diving equipment with physical divers, HSE, etc.

Transfer of aquatic invasive species to restricted areas can lead to requirement of immediate hull cleaning before entering a specific area. This causes additional waiting time for an external cleaning service and inflicts a heavy penalty. No current solutions perform preventive cleaning of the hull of large marine vessels as a permanent installed solution. Various apparatuses and methods have been proposed, including proposals for attaching such apparatus to the hull, but no functioning and reliable permanent solution is available on the market at present.

GB2528871 discloses a crawling remotely operated vehicle (ROV) for cleaning and/or inspecting hulls. The ROV comprises an electrically-driven, on-board hydraulic power unit (HPU). The ROV further comprises tracks for providing adhesion and traction on a hull. The tracks are proceeded with traction pads that attached to links of the tracks. The traction pads comprise magnet blocks provided with elastomeric pads or with elastomeric coating.

US2014230711 discloses a chassis that clings to a ship hull or other ferrous surface by a magnet that moves toward or away from the surface to adjust the magnet air gap and thus the attractive force. The magnet(s) can be the only clinging force or used with other sources such as a suction chamber or fluid jet drive. An internal magnet on a crank mechanism can pivot around a wheel rotation axis inside a wheel body having a non-ferrous traction surface or tire. The magnet gap is least at an angle perpendicular to the surface on which the wheel rests, and larger at an angle oblique to that, for varying the attractive force to two or more levels. The vehicle can be an autonomous hull maintenance device with sensors, controllers and actuators to sense, measure and clean away fouling. The chassis is provided with tools for cleaning the hull of a ship to which the chassis clings.

CN101704241 discloses a wall-climbing robot for removing rust on wall surfaces of ships and a working method thereof. The wall-climbing robot comprises a frame, a chain track walking mechanism, a permanent magnetic adsorption unit, a left-upper drive motor, a left-upper decelerator, a right-lower drive motor and a right-lower decelerator, wherein the chain track walking mechanism consists of a left chain track and a right chain track, the permanent magnetic adsorption unit is mounted on the chain track walking mechanism, and an ultrahigh pressure water jet vacuum rust-removing cleaner is externally connected with a vacuum source and the permanent magnetic adsorption unit to form vacuum permanent magnetic mixed adsorption. The method comprises the steps of regulation of the tension of chains, height adjustment and movement control. In the aspects of the disclosed embodiments, by adopting the vacuum permanent magnetic mixed adsorption mode to design the wall-climbing robot and utilizing and recycling negative pressure of the rust vacuum in combination with permanent magnetic adsorption force, the wall-climbing robot achieves adsorption, safe working and compact adsorption structure and is capable of realizing working with large load at high altitude.

SUMMARY

It is an object of the disclosed embodiments to provide an apparatus for cleaning a hull of a marine vessel that can be reliably attached to the hull by magnetic continuous tracks.

The foregoing and other objects are achieved by the features of the independent claims. Further implementation forms are apparent from the dependent claims, the description and the figures.

According to a first aspect there is provided an apparatus for cleaning the outer side of the hull of a marine vessel and for cleaning the wall of cargo holds, the apparatus comprising: a housing provided with magnetic continuous tracks at opposing lateral sides of the housing, a front wheel and a rear wheel for each of the magnetic continuous tracks, each magnetic continuous track comprising a plurality of links interconnected by drive pins, the links having an inwardly facing side and an outwardly facing side, a guide configured to engage the drive pins for preventing the links in a first portion of the extent of the of at least one of the magnetic continuous tracks between the front wheel and the rear wheel from moving in the direction in which the outwardly facing side faces.

By providing a guide that prevents movement of a drive pin in the outward direction it becomes practically impossible for the magnetic links to be detached (peeled) from the hull "one by one" due to flexing of the continuous track (flexing relative to the straight line between the front and rear wheel assumed by the portion of the continuous tracks when no force is applied to the portion of the continuous track concerned). The guide ensures that the links that are in contact with the hull behave as if they were secured to a rigid body and arranged in a straight line. Thus, the apparatus can only be disengaged from the hull by all magnetic links losing contact simultaneously as opposed to the links of the continuous track being "peeled off one link at a time". This effect of the links acting as one rigid body of links significantly increases the force or load at which a magnetic continuous track disengages form the hull. Without the guide the force/load corresponds roughly to the force that is required to detach a single link. With the guide the force/load at which the magnetic track disengages from the hull corresponds substantially to the force required to disengage a single link multiplied by the number of links simultaneously supported by the guide. Since the guide can support all the links that extend between the wheels at the side of the apparatus that is facing the hull the force/load required to detach the apparatus can be multiplied by a factor that corresponds to the number of links that are in simultaneously contact with the hull.

In a first possible implementation form of the first aspect the apparatus has a bottom side configured for facing the outer side of the hull or wall of the cargo hold, and wherein the first portion is arranged at the bottom side of the apparatus.

In a second possible implementation form of the first aspect each magnetic continuous track runs around one of the front wheels and one of the rear wheels, with each of the magnetic continuous tracks substantially extending straight between the one of the front wheels and the one of the rear wheels on the side of the apparatus for facing the outer side of the hull or wall of the cargo hold.

In a third possible implementation form of the first aspect the guide comprises a guide surface extending substantially straight along the first part.

In a fourth possible implementation form of the first aspect the guide surface is configured for guiding the drive pins.

In a fifth possible implementation form of the first aspect the guide comprises a side parallel with the plane of revolution of the front wheel and rear wheel and the guide surface at a right angle with the side panel In a sixth possible implementation form of the first aspect the guide surface is an integral part of the side panel, the guide surface preferably being formed by a ledge extending at a right angle to the side panel.

In a seventh possible implementation form of the first aspect the apparatus comprises two opposing guides for each magnetic continuous track, with one guide at each side of the magnetic continuous track concerned.

In an eighth possible implementation form of the first aspect the guide comprises a curved portion for following the path of the magnetic continuous track concerned around the front and/or rear wheel.

In a ninth possible implementation form of the first aspect the guide is configured to guide the drive pins along a straight line between the front wheel and the rear wheel.

In a tenth possible implementation form of the first aspect the guide is configured to prevent the links from being pulled from a straight-line configuration in the extend of the magnetic continuous tracks.

According to a second aspect there is provided a link for a magnetic continuous track, in which a plurality of the links is interconnected by drive pins, the link comprising an inwardly facing side and an outwardly facing side, the link comprising an embedded permanent magnet, the outwardly facing side being provided with one or more exchangeable friction pads.

In a first possible implementation form of the second aspect the friction pads are received in matching slots that open to the outwardly facing side.

In a second possible implementation form of the second aspect the permanent magnet is arranged close to the surface of the outwardly facing side and wherein the slots are arranged adjacent the permanent magnet, preferably at opposing sides of the permanent magnet.

According to a third aspect there is provided an assembly of a link according to the second aspect and any one implementation thereof, and a plurality of friction pads with different height for adjusting the extent to which the friction pads protrude from the surface of the outwardly facing side.

According to a fourth aspect there is provided a method for adjusting the distance between a permanent magnet in a link of a magnetic continuous track, and the wall or hull to which the magnetic continuous track is magnetically attached, the method comprising providing the links with exchangeable friction pads that protrude from an outwardly facing surface of the link and adjusting the extent in which the friction pads protrude from the outwardly facing surface.

By choosing friction pads with a given height, the distance between the permanent magnet that is embedded in the link concerned and the wall or hull to which the link is attached can be regulated and thereby the attachment force can be regulated in according to needs.

According to a fifth aspect there is provided a submersible apparatus for cleaning the outer side of the hull of a marine vessel and for cleaning the wall of cargo space in the cargo holds, the apparatus comprising a watertight housing provided with magnetic continuous tracks at opposing lateral sides of the housing, at least one drive motor in the housing operably connected to at least one magnetic continuous track for driving the magnetic continuous tracks, the housing being provided with a main side between the magnetic continuous tracks, the main side preferably facing away from the hull, the main side being configured for detachably attaching a tool.

The apparatus enables early cleaning to prevent heavy fouling by removing the fouling at an early stage. The preventive cleaning is supported by gentle cleaning by either high pressure water jetting or brushes. The cleaning can be done at any time anywhere in the world, as the apparatus is permanently installed on the marine vessel, preferably also whilst the marine vessel is sailing.

Due to magnetic adhesion, the apparatus is able to clean during sailing. Due to magnetic tracks the apparatus can clean above the water line, which is needed due to different water levels during cargo/ballast, etc.

The apparatus is permanently installed on the marine vessel whilst all current solutions are "call on demand"— The solution is permanently on board vessel for use when needed.

In a first possible implementation form of the fifth aspect the two magnetic continuous tracks are provided with a plurality of permanent magnets substantially equally distributed along the length of the continuous tracks for allowing the continuous tracks to magnetically adhere to the hull of the marine vessel.

In a second possible implementation form of the fifth aspect the housing as a front and a rear, the apparatus further comprising a front wheel and a rear wheel for each of the two magnetic continuous tracks, the housing comprising two electric drive motors, one electric drive motor being operably connected to the front wheel of one of the magnetic continuous tracks and the other electric drive motor being operably connected to a rear wheel of the other one of the magnetic continuous tracks.

In a third possible implementation form of the fifth aspect each electric drive motor is provided with a reduction gear that forms one integral unit with the electric drive motor with the combination of the reduction gear and the electric drive motor preferably having a substantially cylindrical shape, with the respective driven front or rear wheel being directly fitted to an output shaft of the reduction gear or to an output shaft of a clutch unit connected to the reduction gear.

In a fourth possible implementation form of the fifth aspect a portion of the electric drive motor opposite to the output shaft protrudes from a lateral side of the housing with a non-driven front or rear wheel having an offset that allows for the protruding portion of the electric drive motor to be received inside the non-driven front or rear wheel being disposed over the protruding portion.

In a fifth possible implementation form of the fifth aspect the electric drive motors are disposed at or near the two opposite longitudinal ends of the housing with their respective output shaft and/or the respective output shafts of the reduction gear coupled to the electric drive motor concerned being directed in opposite directions and preferably protruding from opposite lateral sides of the housing at or near opposite longitudinal ends of the housing.

In a sixth possible implementation form of the fifth aspect the apparatus further comprises a clutch unit integrally connected to the electric drive motor and reduction gear unit, the combination of the drive motor, reduction gear and the clutch unit preferably having a cylindrical shape.

In a seventh possible implementation form of the fifth aspect the main side is provided with a versatile mounting plate for detachably attaching a tool.

In an eighth possible implementation form of the fifth aspect the housing is provided with front or rear side that is provided with a configurable interface area for attaching lights, cameras or sensors.

In a ninth possible implementation form of the fifth aspect further comprising a docking station connected to the apparatus by a suspension wire, a power cable and/or a communication cable.

In a tenth possible implementation form of the fifth aspect the docking station is provided with a high-pressure pump for delivering high pressure water and wherein an inlet of a high-pressure cleaning tool attached to the apparatus is connected via a high-pressure hose to an outlet of the high-pressure pump.

In an eleventh possible implementation form of the fifth aspect the cleaning tool comprises nozzles and/or brushes rotatable by a least one brush drive, the brush drive preferably being powered by high pressure water from the high-pressure pump.

In a twelfth possible implementation form of the fifth aspect a user interface unit is coupled to, or part of the docking station, the user interface unit being preferably provided with user interface elements for controlling the operation of the apparatus in response to input from a human operator.

In a thirteenth possible implementation form of the fifth aspect the docking station is provided with a water hose on a hose reel for connecting to a water supply system of the marine vessel and/or with a power cable and power cable reel for connecting to the grid of the marine vessel.

In a fourteenth possible implementation form of the fifth aspect the docking station is provided with a motorized wire reel for the suspension wire and/or with a cable reel for the power cable and/or communication cable and/or with a high-pressure hose reel for the high-pressure hose.

In a fifteenth possible implementation form of the fifth aspect the docking station is wheeled and wherein the apparatus and the docking station are configured such that the apparatus can be carried and transported by the docking station.

In a sixteenth possible implementation form of the fifth aspect the docking station is provided with an RFID transceiver configured to read an RFID transponder provided on the marine vessel. A transponder is placed on the vessel and by placing the docking station above or near this RFID transponder, the right route is automatically selected for cleaning.

In a sixteenth possible implementation form of the fifth aspect the apparatus and or the docking station is provided with an electronic control unit configured for semi or full automatic cleaning.

In a seventeenth possible implementation form of the fifth aspect the electronic control unit is configure to perform a preprogrammed route for optimized cleaning.

These and other aspects of the disclosed embodiments will be apparent from and the embodiments described below.

BRIEF DESCRIPTION OF THE DRAWINGS

In the following detailed portion of the present disclosure, the aspects will be explained in more detail with reference to the example embodiments shown in the drawings, in which:

FIG. 6 is an elevated view of a portion of the deck of the marine vessel of FIG. 5 illustration a parking place for a docking station associated with the apparatus of FIGS. 1 and 2, FIG. 7. is an elevated view of the docking station associated with the apparatus of FIGS. 1 and 2 parked on the parking place of FIG. 6, FIGS. 8 and 9 are front and rear elevated views of another example embodiment of an apparatus for hull cleaning, respectively, FIG. 14 is an enlarged detail of the view of FIG. 13, FIG. 15 is a top view of a magnetic continuous track of the apparatus of FIGS. 8 and 9.

DETAILED DESCRIPTION

Figure 1:
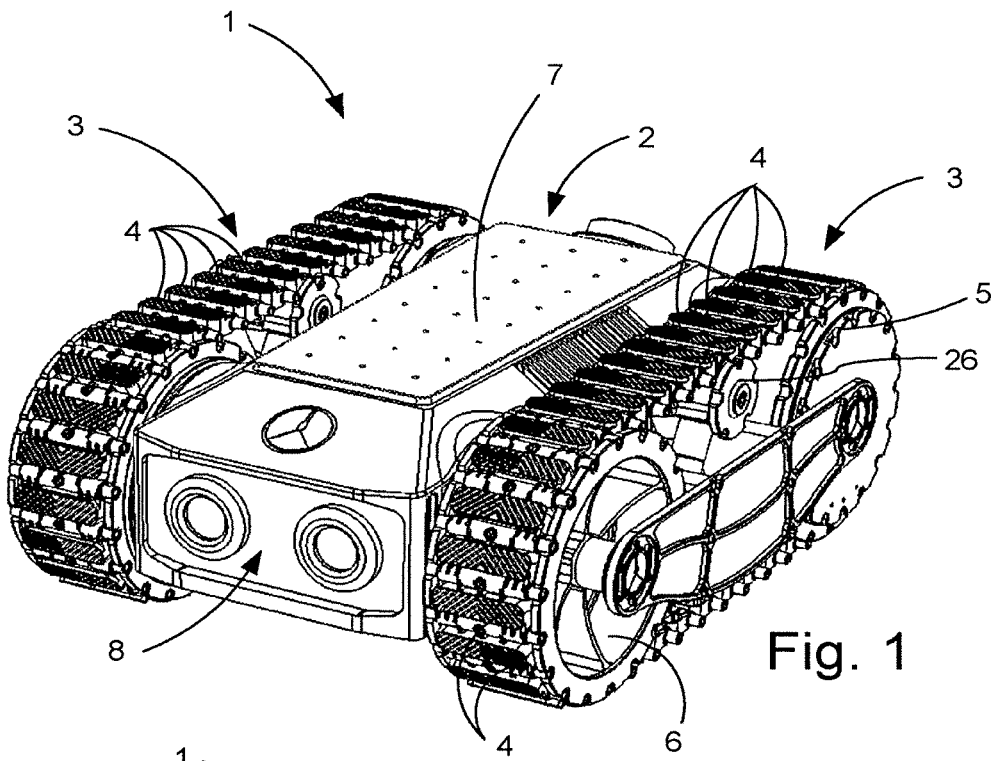
FIGS. 1 and 2 are front and rear elevated views of an example embodiment of an apparatus for hull cleaning, respectively.
Figure 2:
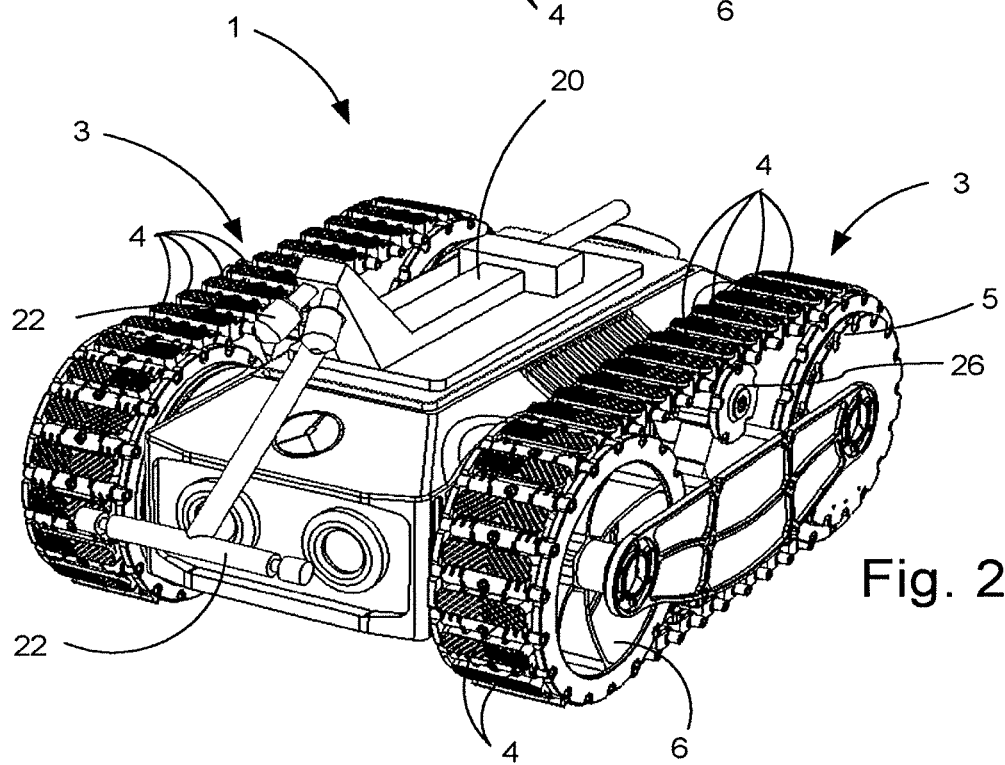
Figure 5:
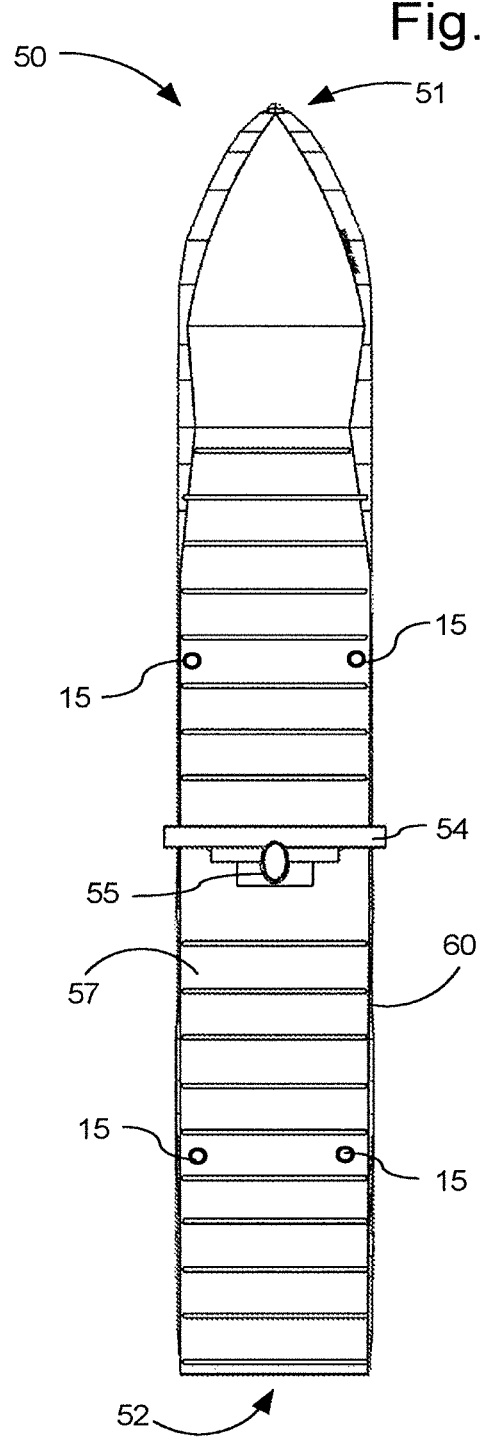
FIG. 5 is top view of a marine vessel on which the apparatus of FIGS. 1 and 2 an be used to clean the hull and the walls of the cargo space.
Figure 8:
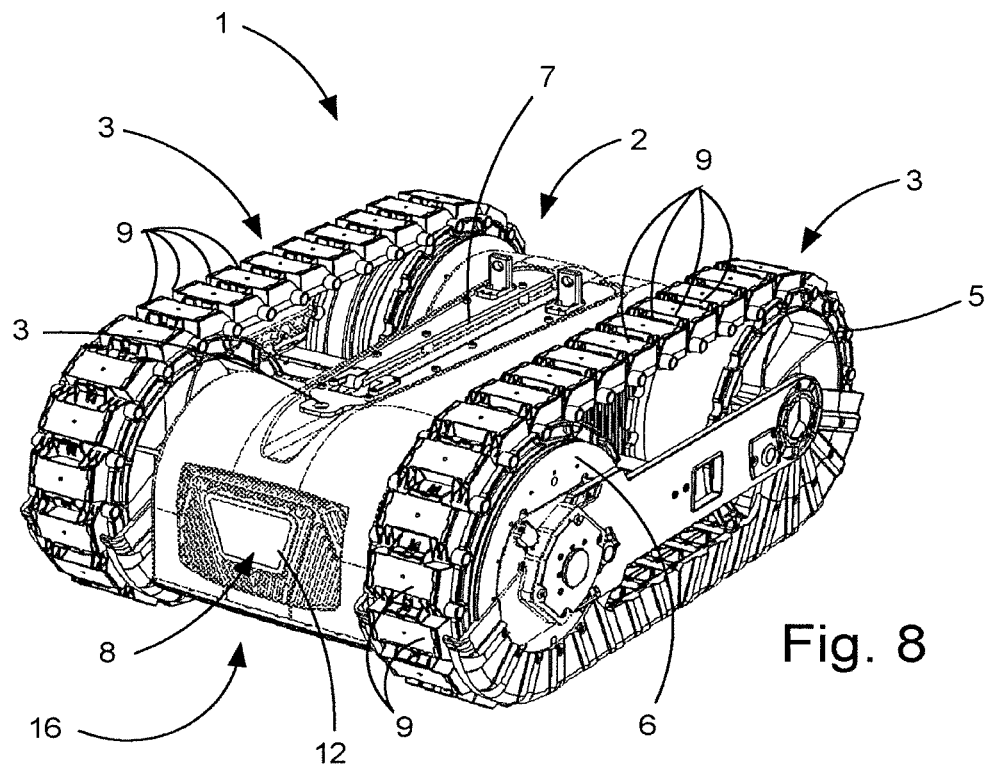
Figure 9:
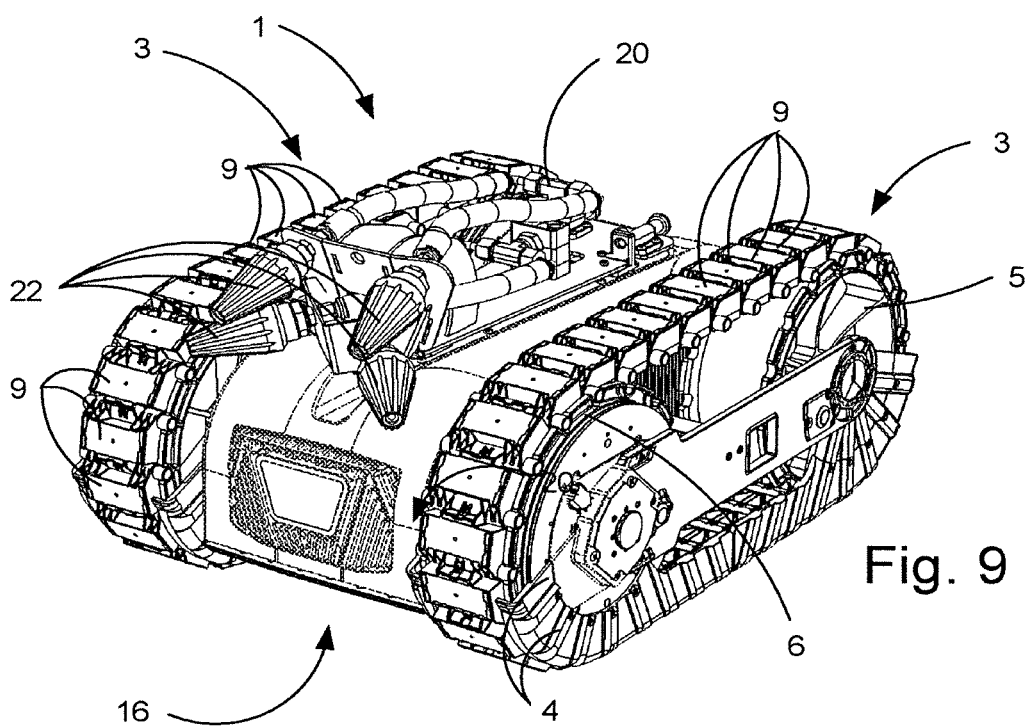
Figure 10:
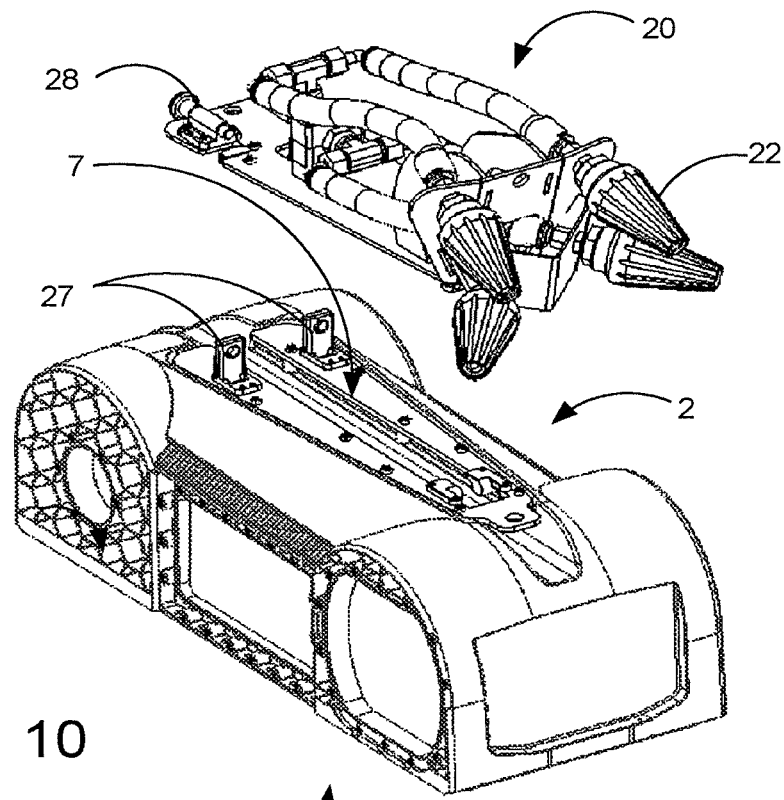
FIG. 10 is a detailed semi exploded view of a housing and tool of the apparatus of FIGS. 8 and 9.
Figure 11:
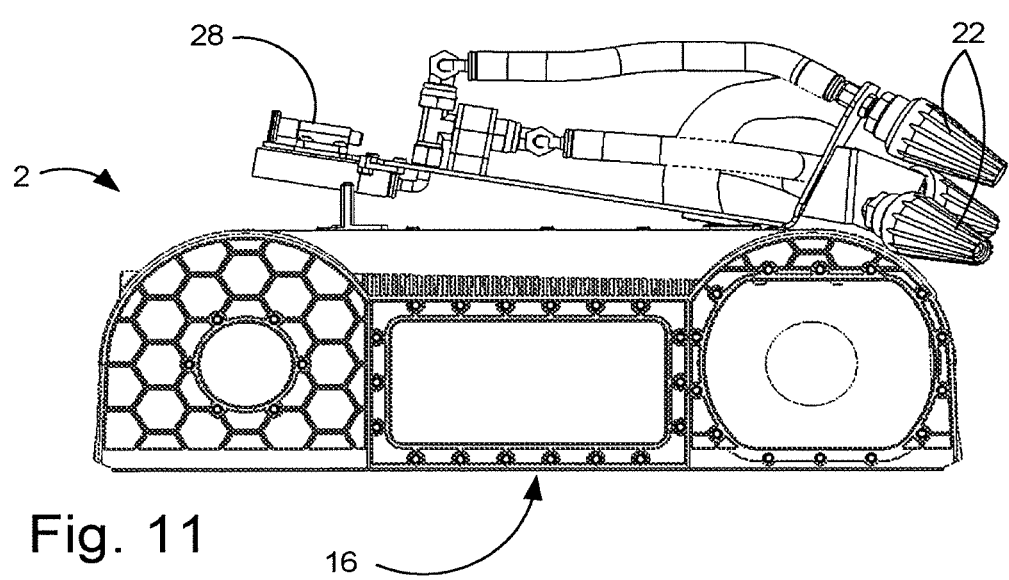
FIG. 11 is a detailed side view of a housing and a tool of the apparatus of FIGS. 8 and 9.
Figure 12:
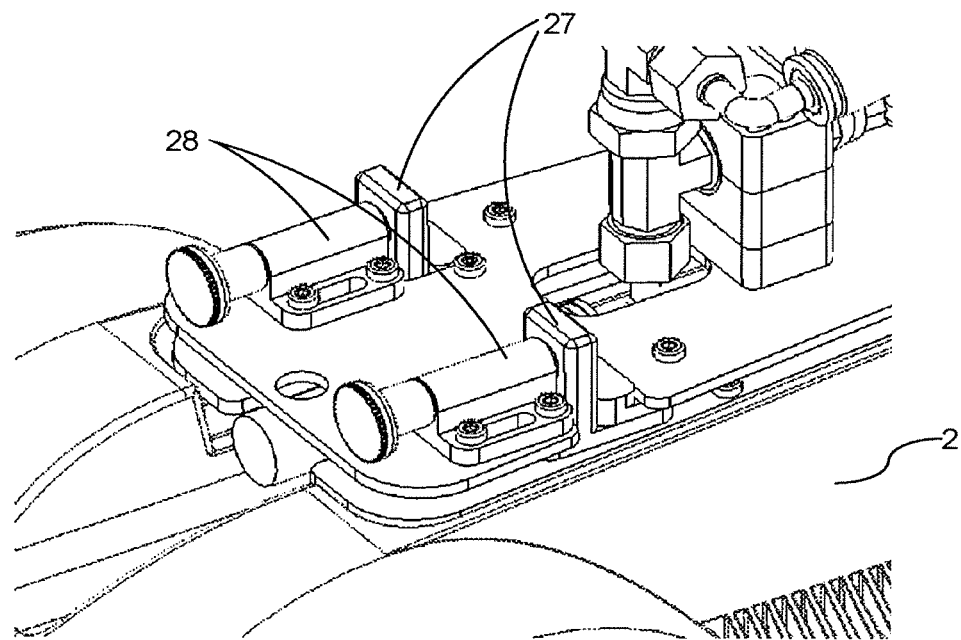
FIG. 12 is an enlarged detail of FIG. 11.
Figure 13:
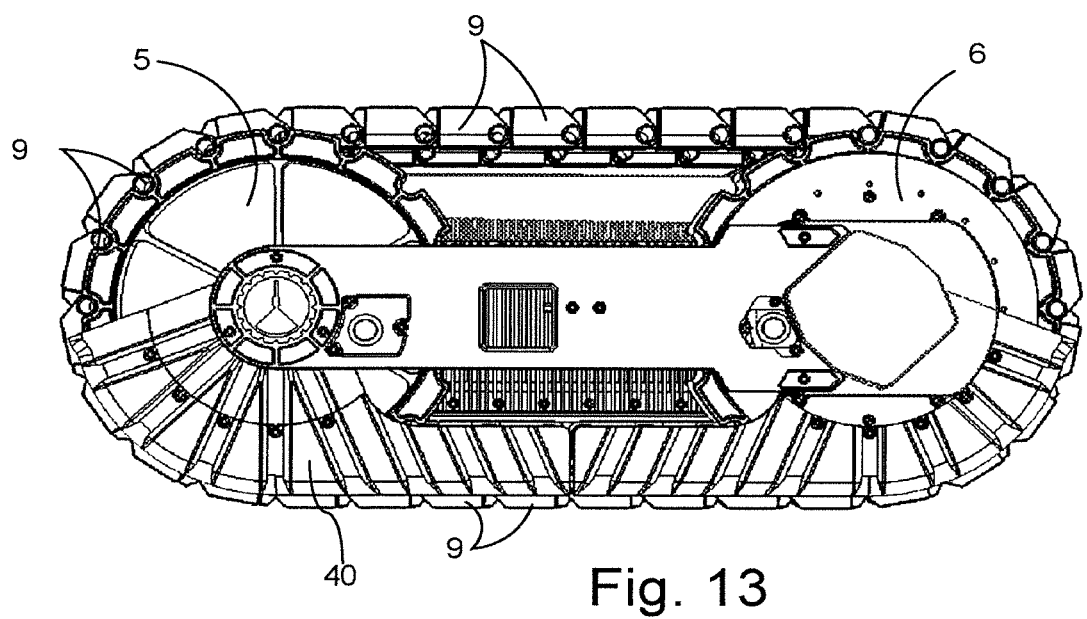
FIG. 13 is a side view of the apparatus for FIGS. 8 and 9, without a tool attached thereto.

FIGS. 1 and 2 show a submersible apparatus 1 for cleaning the outer side of the hull 60 of a marine vessel 50 (FIG. 5). The apparatus 1 is also suitable for cleaning the wall of a cargo space in the cargo holds 60. The apparatus 1 comprises a watertight housing 2 provided with magnetic continuous tracks 3 at opposing lateral sides of the watertight housing 2.

The magnetic endless tracks are in an embodiment provided with one or more road wheels (not shown) and with one or more idlers 26. The magnetic tracks are built from modular chain links joined by a hinge, with each link or each second link being provided with a permanent magnet.

At least one drive motor 14, 17 in the watertight housing 2 is operably connected to at least one magnetic continuous track 3 for driving the magnetic continuous tracks 3. The watertight housing 2 is provided with a main side 7 between the magnetic continuous tracks 3. The main side 7 facing away from the hull or the wall of the cargo room during cleaning operation. The main side 7 is provided with a versatile mounting plate for detachably attaching a cleaning tool 20, e.g. by a magnetic or quick coupling(s) (not shown). The cleaning tool 20 can be one of a variety of types. On type of cleaning tool 20 comprises high pressure cleaning nozzles 22 and inlet for connecting to a high-pressure water hose (not shown). The cleaning apparatus 20 may in an embodiment (not shown) comprise rotating brushes and a drive powered by high pressure water received via the high-pressure hose or by electric drive motors.

The two magnetic continuous tracks 3 are provided with a plurality of permanent magnets 4 substantially equally distributed along the length the continuous tracks 3 for allowing the continuous tracks to magnetically adhere to the hull or wall of the cargo space of the marine vessel 50.

Each permanent magnet 4 is molded into a rubber material and then remolded into a polymer housing, with the rubber penetrating the part of the polymer housing, with is facing the steel surface. This allows to change hardness of the tracks, depending on the type of surface to be cleaned. The watertight housing 2 comprises a front and a rear. The apparatus 1 further comprises a front wheel and a rear wheel watertight 5,6 for each of the two magnetic continuous tracks 3. The housing 2 comprises two electric drive motors 14,17. Electric drive motor 14 being operably connected to the driven front wheel 6 of one of the magnetic continuous tracks 3 and the other electric drive motor 17 being operably connected to the rear wheel 6 of the magnetic continuous track.

Each electric drive motor 14,17 is provided with a reduction gear 15,18 that forms one integral unit with the electric drive motor 14,17 concerned with the combination of the reduction gear 15,18 and the electric drive motor 14, having a substantially cylindrical shape, with the respective driven front or rear wheel 6 being directly fitted to an output shaft 27,28 of the reduction gear or of a clutch 16,19 operably connected with the respective reduction gear 15,18.

A portion of the electric drive motor 14,17 opposite to the output shaft 27,28 protrudes from a lateral side of the housing with a non-driven front or rear wheel 5 having an offset that allows for the protruding portion of the electric drive motor 14,17 to be received inside the non-driven front or rear wheel 5 being disposed over the protruding portion.

The electric drive motors 14,17 are disposed at or near the two opposite longitudinal ends of the watertight housing 2 with their respective output shaft and/or the respective output shafts 27,28 of the reduction gear 16,18 coupled to the electric drive motor 14,17 concerned being directed in opposite directions and preferably protruding from opposite lateral sides of the watertight housing 2 at or near opposite longitudinal ends of the housing 2.

The apparatus 1 comprises a clutch unit 16,19 integrally connected to the electric drive motor and reduction gear unit. The combination of the drive motor, reduction gear and the clutch unit preferably having a cylindrical shape. The watertight housing 2 is provided with front or rear side 8 that is provided with a configurable interface area for attaching lights, cameras or sensors 12.

FIG. 7 shows a docking station 30 associate with and connected to the apparatus by a suspension wire 23 for ensuring that the apparatus 1 is not lost if the magnetic endless tracks 3 should inadvertently become detached from the hull or from the wall of the cargo hold. A power cable 24 extends between the docking station 30 and the apparatus 1 for supplying the apparatus 1 with electrical power. A communication cable (not shown), that can in embodiment be integrated into the power cable 24 allows for the transmission of signals between the apparatus 1 and the docking station 30.

The docking station 30 is provided with a high-pressure pump (not shown) for delivering high pressure water. An inlet of a high-pressure cleaning tool 20 attached to the apparatus 1 is connected via a high-pressure hose (not shown) to an outlet of the high-pressure pump.

When the apparatus 1 is used for cleaning the cargo hold, the docking station can be dispensed with and instead a simple harness system attached in the hatch openings and act as a drop block. The cleaning tool 20 comprises high pressure cleaning nozzles 22 and/or brushes rotatable by a least one brush drive (not shown) the brush drive preferably powered by high pressure water from the high-pressure pump or by electric drive motors.

A user interface unit 36 is coupled to, or part of the docking station 30. The user interface unit comprises user interface elements for controlling the operation of the apparatus 1 in response to input from a human operator. The apparatus 1 is either configured to perform exact instructions of the human operator or configured to perform tasks autonomously in response to a command from the human operator.

The docking station 30 is provided with a water hose 32 on a hose reel for connecting to a water supply system of the marine vessel 50. The docking station 30 us also provided with a power cable 33 and power cable reel 34 for connecting to the grid of the marine vessel 50.

The docking station 30 is also provided with a motorized wire reel (not shown) for the suspension wire 23 and with a cable reel (not shown) for the power cable 24 and with a high-pressure hose reel (not shown) for the high-pressure hose.

In an embodiment the docking station 30 is wheeled. The apparatus 1 and the docking station 30 are in an embodiment configured such that the apparatus 1 can be placed on the docking station 30 so that the apparatus 1 can be carried and transported by the docking station 30.

The docking station 30 is provided with an RFID (Radio Frequency Identification) transceiver (not shown) configured to read an RFID transponder 15 provided on the deck 57 of the marine vessel 50. RFID transponders 15 are placed on the marine vessel 50 at a suitable parking positions for the docking station 30. By placing the docking station 30 above or near an RFID transponder 15, the right route for the apparatus 1 over the hull section in the area of the parking position is automatically determined by an electronic control unit in the docking station 30 (or in the apparatus 1). An electronic control unit configured for either semi or full automatic cleaning. Various suitable positions for the RFID transponders 15 on the deck of the marine vessel 50 are shown in FIG. 5. In an embodiment the electronic control unit is configured to perform a preprogrammed route for optimized cleaning.

FIG. 5 shows the marine vessel 50 with its hull 60 extending from the bow 51 to the stern 52, bridge 54 and funnel 55 and the RFID transponders 15 for the selected parking positions for the docking station 30.

In operation the apparatus 1 drives starting from the top of the hull 60 face down downwards to the center of the bottom of the hull 60 and back in a suitable pattern, such as e.g. a meandering pattern to cover the area of the hull 60 associated with the parking position of the docking station 30. The motorized wire reel keeps a minimum amount of tension in the suspension wire 23 to avoid that the wire 23 has slack. The power cable reel and the high-pressure hose reel are resilient or motorized in order to keep the power cable and high pressure hose at light tension during movement of the apparatus 1.

Figure 3:
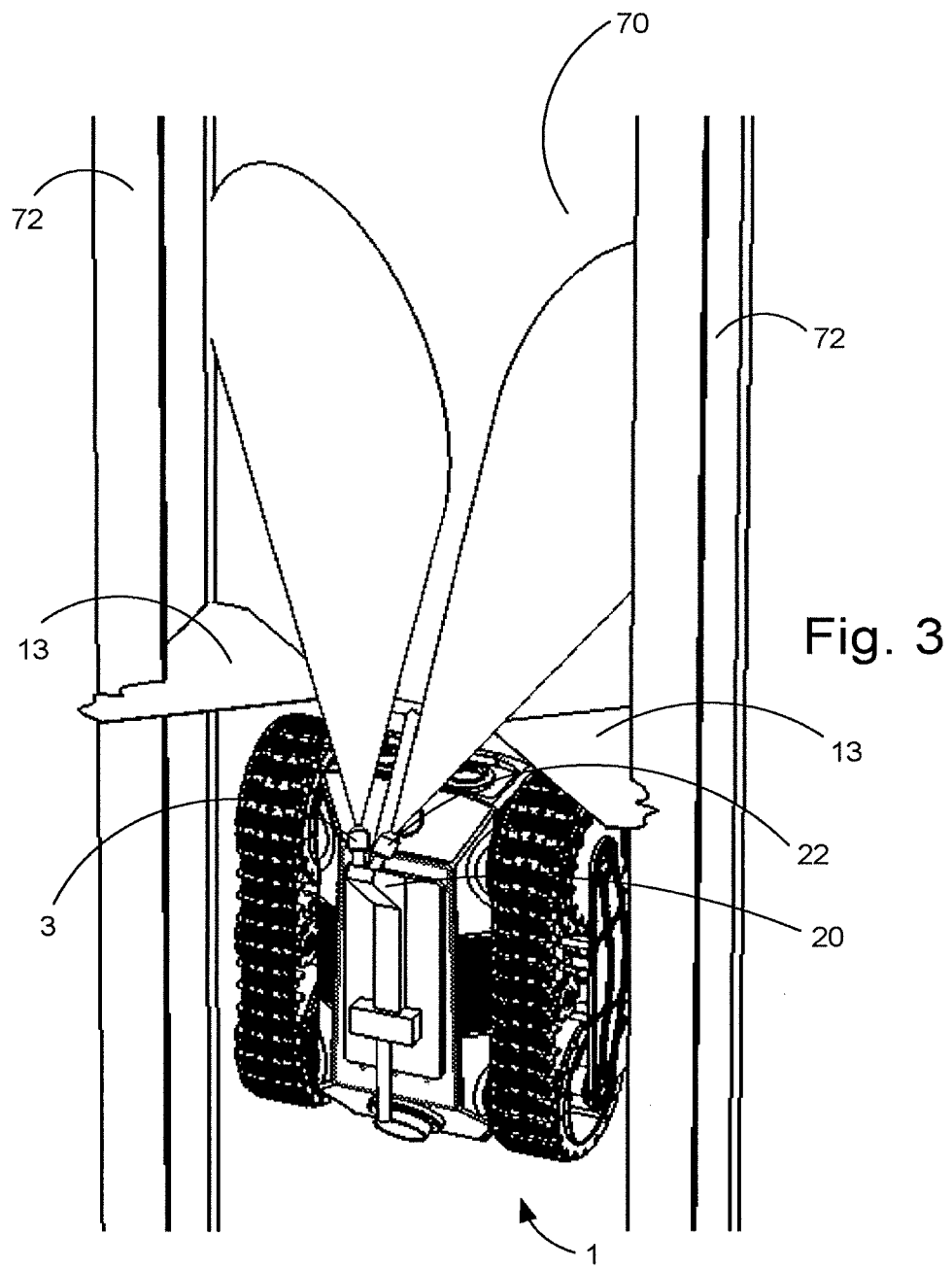
FIG. 3 is an elevated view of the applause of FIGS. 1 and 2 in action on the cargo hold of a marine vessel.
Figure 4:
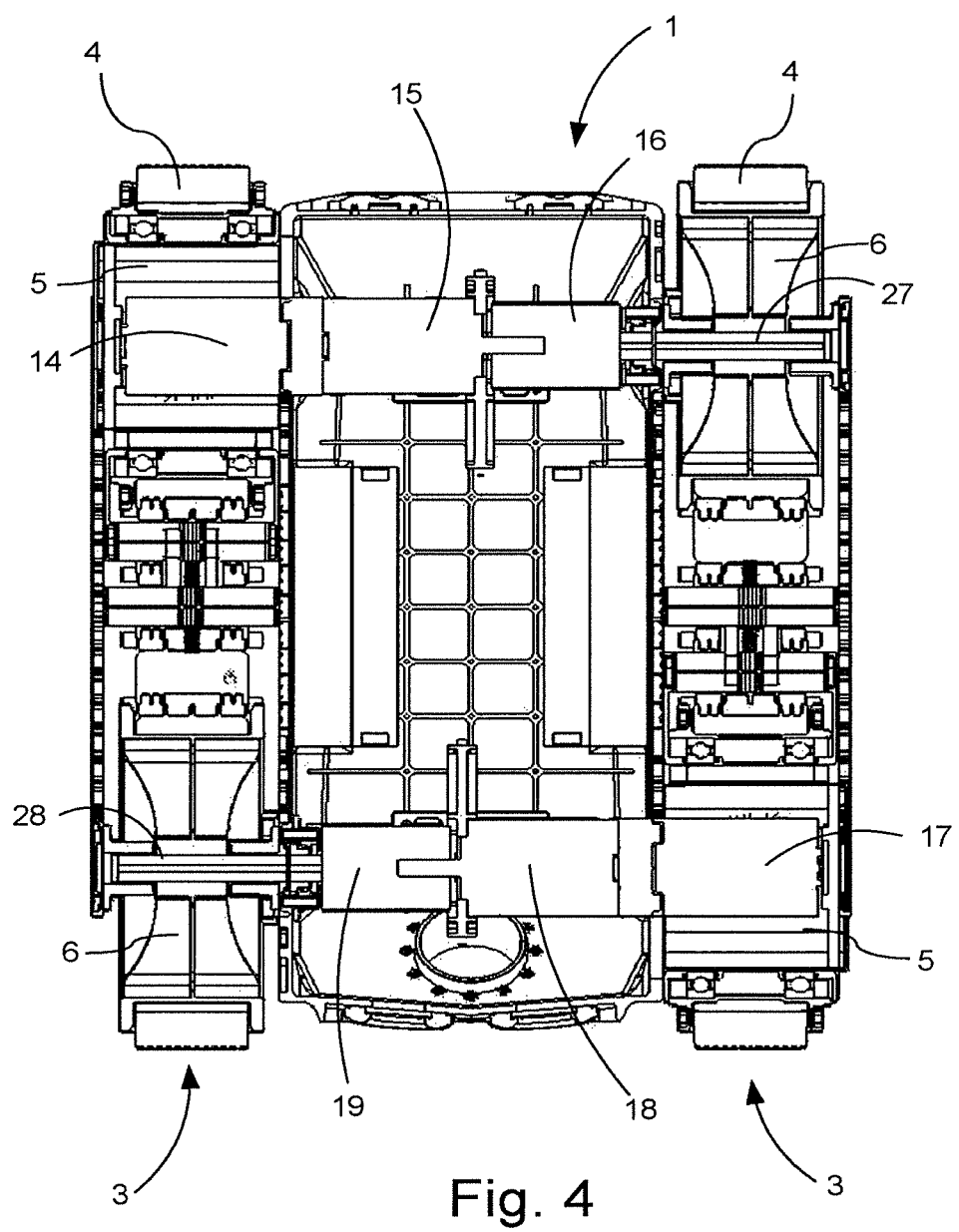
FIG. 4 is a sectional view of the apparatus of FIGS. 1 and 2.

FIG. 3 shows the apparatus 1 in action on a wall 70 of a cargo space. water jets 13 clean the surface of the cargo hold, including any beams 72. The apparatus 1 is further provided with various sensors that provide signals that allow the apparatus to keep distance from obstacles such as beams 72 and assist operation of the apparatus.

In operation the apparatus 1 drives starting from the bottom of the cargo space face up downwards top of the of cargo space and back in a pattern, such as e.g. a meandering pattern or any other suitable pattern to cover the area of the cargo space associated with the present parking position of the docking station 30. The presence of a suspension wire 23 is not essential for use of the apparatus 1 for cleaning a cargo space.

The apparatus 1 enables early cleaning to prevent heavy fouling. The preventive cleaning is supported by gentle cleaning by either high pressure water jetting or brushes. Due to magnetic adhesion the apparatus 1 is able to clean during sailing. Due to magnetic tracks the apparatus can clean above the water line, which is needed due to different water levels during cargo/ballast, etc.

The apparatus 1 can be permanently installed on the marine vessel whilst all current solutions are "call on demand"—Our solution is permanently on board vessel for use when needed.

FIGS. 8 to 21 disclose another embodiment of the apparatus 1. for cleaning the outer side of the hull 60 of a marine vessel 50 and for cleaning the wall 70 of cargo holds. In this embodiment the apparatus is similar to the apparatus 1 according to the embodiment above with a preferably water-tight housing 2 and with magnetic continuous tracks 3 at opposing lateral sides of the housing 2. The apparatus 1 has a bottom side 16 configured for facing the outer side of the hull or wall of the cargo hold. A first portion of the extent of at least one of the magnetic continuous tracks 3 is arranged at the bottom side 16 of the apparatus 1. Each magnetic continuous track 3 comprises a plurality of links 9 interconnected by drive pins 10. The magnetic continuous tracks 3 run over a front wheel 6 and a rear wheel 5, with at least the front or rear wheel being s driving wheel, i.e. a sprocket that is connected to a drive motor and capable of engaging drive pins in the connect the links 9 of the magnetic continuous tracks 3. The links 9 have an inwardly facing side 18 and an outwardly facing side 19.

The drive pins 10 protrude laterally form the links 9. This facilitates the sprocket engaging the drive pins 10 and facilitates a guide 40 to engage the drive pins 10. The guide 40 prevents the links 9 in a first portion of the extent of the magnetic continuous tracks 3 between the front wheel 6 and the rear wheel 5 from moving in the direction in which the outwardly facing side 19 faces.

The guide 40 that prevents movement of a drive pin 10 in the outward direction. Thus, it becomes practically impossible for the links 9 to be detached (peeled) from the hull "one by one" due to flexing of the continuous track (flexing relative to the straight line between the front and rear wheel assumed by the portion of the continuous tracks 3 when no force is applied to the portion of the continuous track concerned). The guide 40 ensures that the links 9 that are in contact with the hull behave as if they were secured to a rigid body and arranged in a straight line. Thus, the apparatus 1 can only be disengaged from the hull by all magnetic links 9 loosing contact simultaneously as opposed to the links 9 of the magnetic continuous track 3 being "peeled off one link at a time". This effect of the links 9 acting as one rigid body of links significantly increases the force or load at which a magnetic continuous track disengages form the hull. Without the guide 40 the force/load corresponds roughly to the force that is required to detach a single link 9. With the guide 40 the force/load at which the magnetic continuous track 3 disengages from the hull corresponds substantially to the force required to disengage a single link 9 multiplied by the number of links 9 simultaneously supported by the guide 40. Since the guide 40 can support all the links that extend between front and rear wheels at the side 16 of the apparatus that is facing the hull the force/load required to detach the apparatus can be multiplied by a factor that corresponds to the number of links 9 that are in simultaneously contact with the hull.

Each of the magnetic continuous tracks 3 extends substantially straight between a front wheel 6 and a rear wheel 5 both on the main side where a tool can be releasably attached and on the side 16 of the apparatus 1 for facing the outer side of the hull or wall of the cargo hold. The tool 20 can be provided with spay nozzles 22 that a coupled to a source of high pressure. The tool is releasably attached to the housing 2 of the apparatus by quick release bolts 28 that cooperate with lugs 27

The guide 40 is provided with a guide surface 41 that extends substantially straight along the first part. The guide surface can extend along the full length of the magnetic continuous track between the front and rear wheel, as shown, or only along a portion thereof (not shown). As shown, the guide surface 41 may also include a curved portion that follows the arch of the front and/or rear wheel. The guide surface 41 is configured for guiding the drive pins 10 by forming a rail like body along which the drive pins can slide whilst being prevented from mowing in the direction in which the outwardly facing surface 19 of the links concerned are facing.

In an embodiment the guide 40 comprises a first side parallel with the plane of revolution of the front wheel 6 or rear wheel 5 with the guide surface 41 at a right angle with the side panel. Preferably, the guide surface 41 is an integral part of the side panel. The guide surface 41 is preferably being formed by a (bent) ledge extending at a right angle to the side panel. Two opposing guides 40 for each magnetic continuous track 3, with one guide 40 at each side of the magnetic continuous track 3 concerned.

Figure 16:
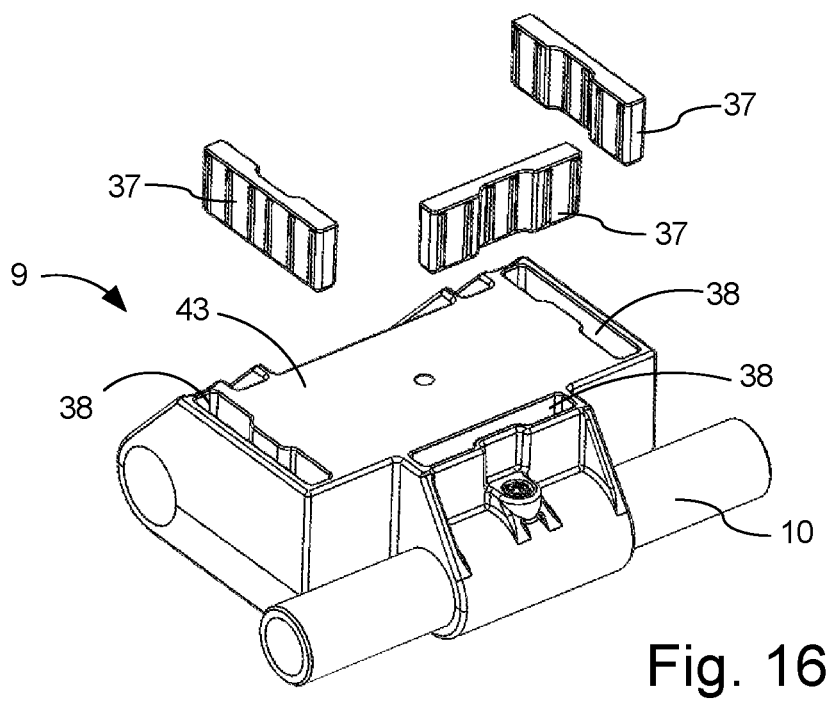
FIG. 16 is an elevated exploded view of a link of a magnetic continuous track of the apparatus of FIGS. 8 and 9.
Figure 17:
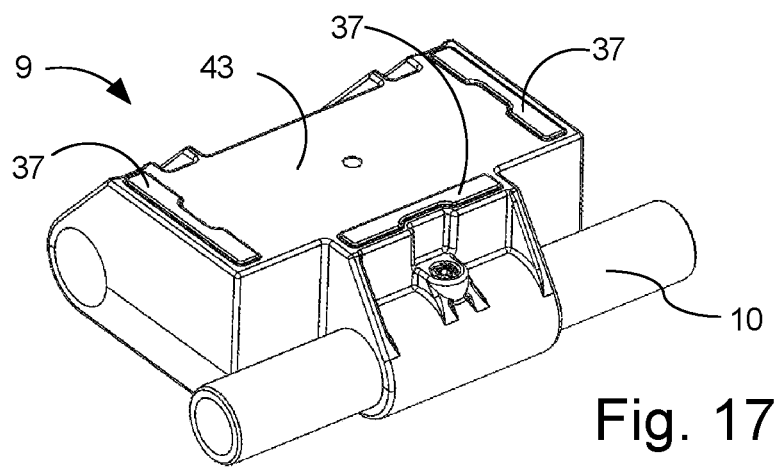
FIG. 17 is an elevated view of the link of a magnetic continuous track of the apparatus of FIGS. 8 and 9.
Figure 18:
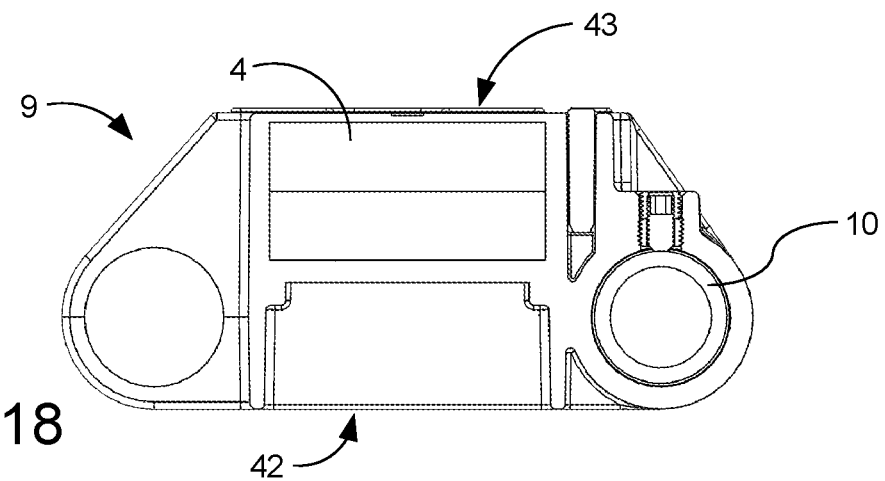
FIG. 18 is a side view of the link of a magnetic continuous track of the apparatus of FIGS. 8 & 9.
Figure 19:
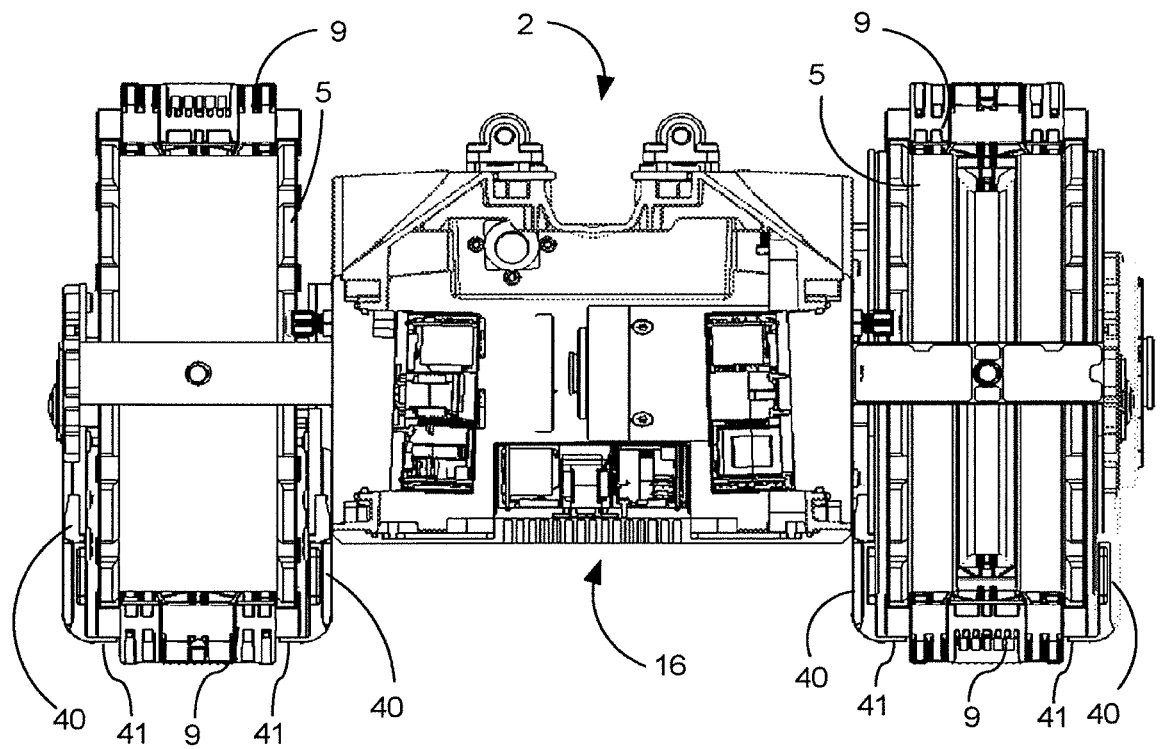
FIG. 19 is a cross sectional view through the apparatus of FIGS. 8 and 9.
Figure 20:
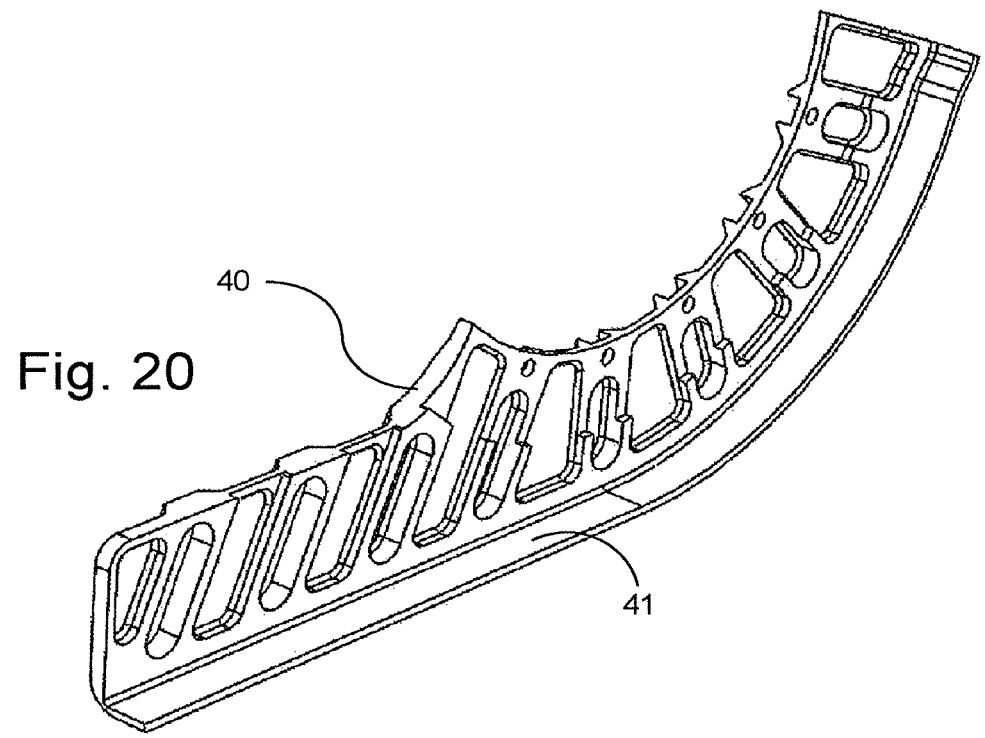
FIG. 20 is an elevated view of a guide for a magnetic continuous track of the apparatus of FIGS. 8 and 9.
Figure 21:
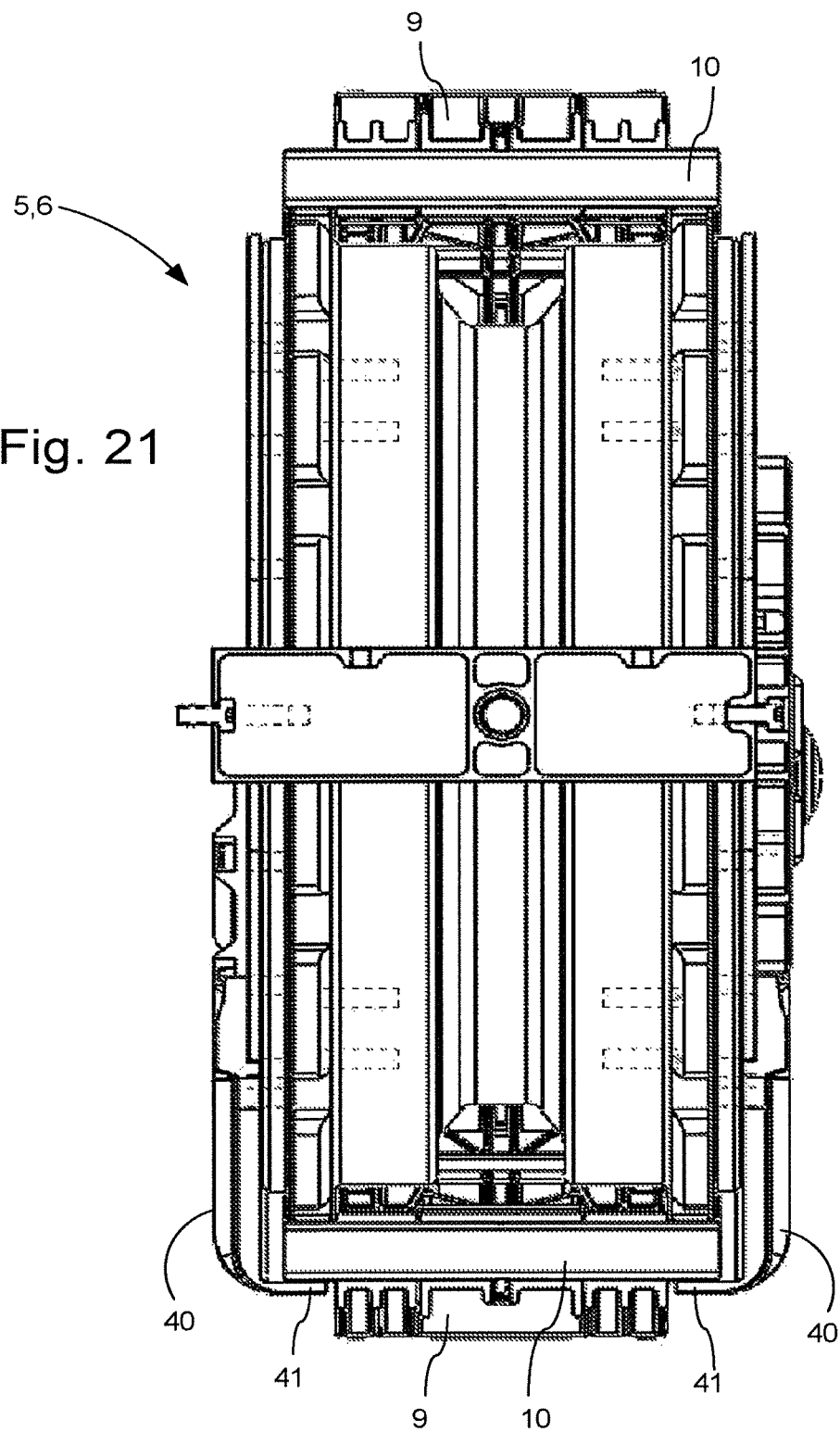
FIG. 21 is an enlarged detail of the view of FIG. 19.

FIGS. 16 to 17 show a link 9 in greater detail. The links comprise an inwardly facing side 42 and an outwardly facing side 43. The links 9 are each provided with an embedded permanent magnet 4. The outwardly facing side 43 is provided with one or more exchangeable friction pads 37 for improving grip and traction. The friction pads 37 are received in matching slots 38 that open to the outwardly facing side 43 so that it is easy to exchange worn friction pads 37 or to exchange for friction pads 37 with another height, i.e., with friction pads that protrude at a different height from the outwardly facing surface 43.

The permanent magnet 4 is arranged close to the surface of the outwardly facing side 43. The slots 38 for receiving friction pads 37 are arranged adjacent the permanent magnet 4, preferably at opposing sides of the permanent magnet 4.

Thus, according to an embodiment there is a method for adjusting the distance between a permanent magnet 4 in a link 9 of a magnetic continuous track 3, and the wall or hull to which the magnetic continuous track 3 is magnetically attached. The method comprises providing the links 9 with exchangeable friction pads 37 that protrude from an outwardly facing surface 43 of the link 9 and adjusting the extent in which the friction pads 37 protrude from the outwardly facing surface by replacing a friction pad 37 of a given height with a friction pad 37 with another height.

The present disclosure has been described in conjunction with various embodiments herein. However, other variations to the disclosed embodiments can be understood and effected by those skilled in the art in practicing the claimed, from a study of the drawings, the disclosure, and the appended claims. In the claims, the word "comprising" does not exclude other elements or steps, and the indefinite article "a" or "an" does not exclude a plurality. A single processor or other unit e.g. in the control unit may fulfill the functions of several items recited in the claims. The mere fact that certain measures are recited in mutually different dependent claims does not indicate that a combination of these measured cannot be used to advantage.

The invention claimed is:

1. A submersible apparatus for cleaning an outer side of a hull of a marine vessel and for cleaning a wall of cargo space in a cargo hold, the apparatus comprising:
 a watertight housing provided with two continuous magnetic tracks at opposing lateral sides of the watertight housing, the watertight housing having a front and a rear, the apparatus further comprising a front wheel and a rear wheel for each of the two continuous magnetic tracks,
 two electric drive motors in the watertight housing, one of the electric drive motors being operably connected to the front wheel of one of the continuous magnetic tracks and the other of the two electric drive motors being operably connected to the rear wheel of another of the continuous magnetic tracks, for driving said continuous magnetic track,
 the watertight housing being provided with a main side between the continuous magnetic tracks, the main side being arranged to face away from the hull or the wall when in use, and being configured for detachably attaching a cleaning tool, and
 wherein a portion of one of the electric drive motors protrudes from one of the lateral sides of the watertight housing with a non-driven wheel having an offset that allows for the protruding portion of the electric drive motor to be received inside the non-driven wheel being disposed over the protruding portion.

2. An apparatus according to claim 1, wherein the two continuous magnetic tracks are provided with a plurality of permanent magnets substantially equally distributed along a length of the continuous tracks for allowing the continuous magnetic tracks to magnetically adhere to the hull of the marine vessel or the wall of the cargo space.

3. An apparatus according to claim 1, wherein each electric drive motor is provided with a reduction gear that forms one integral unit with the electric drive motor with the combination of the reduction gear and the electric drive motor has a substantially cylindrical shape, with the respective driven front or rear wheel being directly fitted to an output shaft of said reduction gear or to an output shaft of a clutch unit connected to said reduction gear.

4. An apparatus according to claim 1, wherein the electric drive motors are disposed at or near two opposite longitudinal ends of the watertight housing with their respective output shaft and/or the respective output shafts of the reduction gear coupled to the electric drive motor concerned being directed in opposite directions and protruding from the opposing lateral sides of the watertight housing at or near the opposite longitudinal ends of the watertight housing.

5. An apparatus according to claim 1, further comprising a clutch unit integrally connected to each of the electric drive motors and reduction gear units, each combination of the drive motor, the reduction gear and the clutch unit having a cylindrical shape.

6. An apparatus according to claim 1, wherein the main side is provided with a versatile mounting plate for detachably attaching the cleaning tool.

7. An apparatus according to 1, wherein the watertight housing is provided with configurable interface areas for attaching lights, cameras or sensors, the interface areas being a side of the watertight housing.

8. An apparatus according to claim 1, further comprising a docking station connected to the apparatus by a suspension wire, a power cable and/or a communication cable.

9. An apparatus according to claim 8, wherein the docking station is provided with a high-pressure pump for delivering high pressure water and wherein an inlet of the cleaning tool is connected via a high-pressure hose to an outlet of the high pressure pump.

10. An apparatus according to claim 8, wherein a user interface unit is coupled to, or part of the docking station, the user interface unit being provided with user interface elements for controlling the operation of the apparatus in response to input from a human operator.

11. An apparatus according to claim 8, wherein the docking station is provided with a water hose on a hose reel for connecting to a water supply system of the marine vessel and/or with a power cable and power cable reel for connecting to the grid of the marine vessel.

12. An apparatus according to claim 8, wherein the docking station is provided with a motorized wire reel for the suspension wire and/or with a cable reel for the power cable and/or communication cable and/or with a high-pressure hose reel for the high-pressure hose.

13. An apparatus according to claim 8, wherein the docking station is wheeled and wherein the apparatus and the docking station are configured such that the apparatus can be carried and transported by the docking station.

14. An apparatus according to claim 8, wherein the docking station is provided with an RFID transceiver configured to read an RFID transponder provided on the marine vessel.

15. An apparatus according to claim 1, wherein the cleaning tool comprises nozzles and/or brushes rotatable by a least one brush drive.

\* \* \* \* \*